Sept. 30, 1947.　　　　A. SCHMIDT　　　　2,428,098
BOTTOM WASHER MACHINE FOR BATTERY CANS
Filed Jan. 11, 1945　　　　2 Sheets-Sheet 2
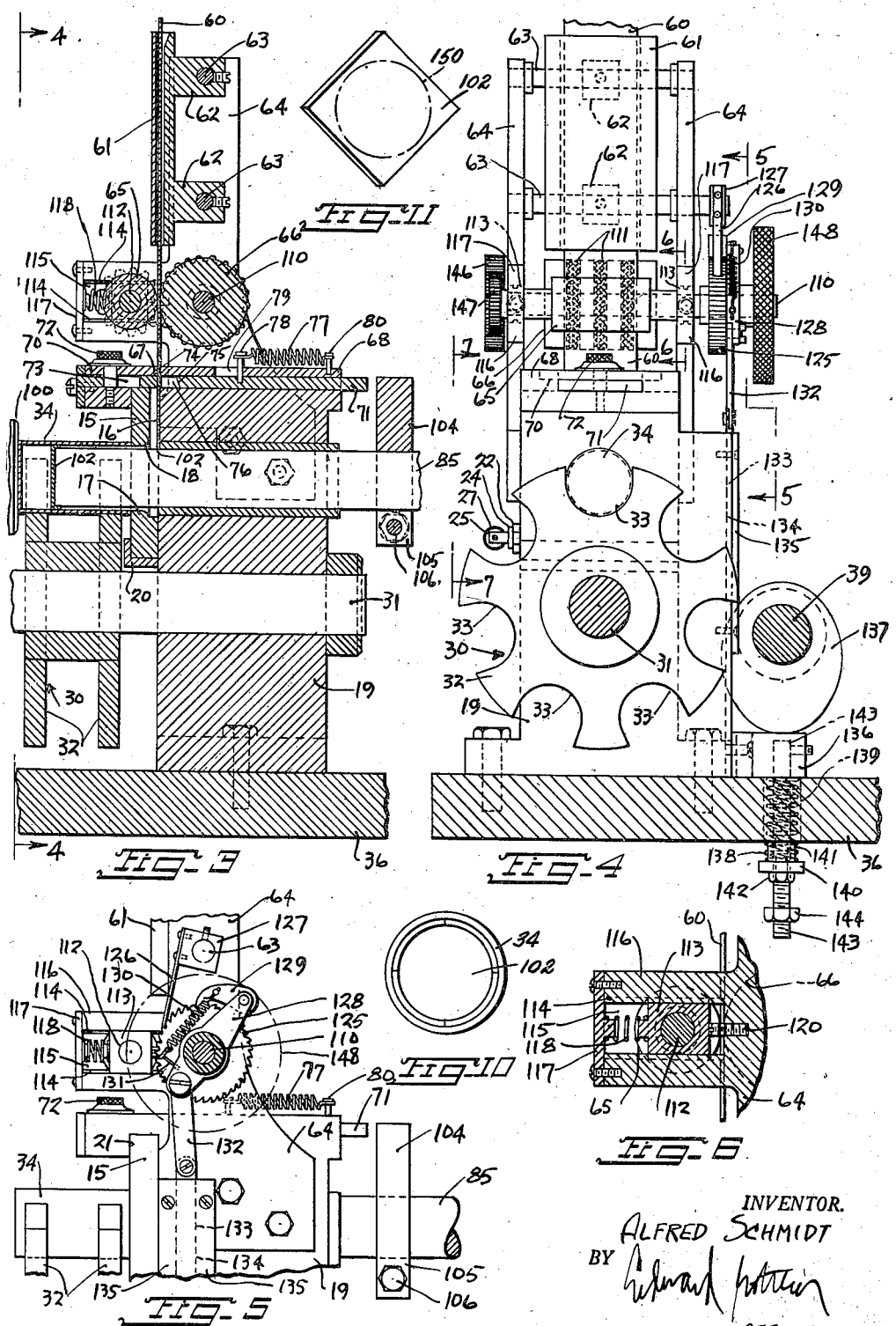
INVENTOR.
ALFRED SCHMIDT
BY
ATTORNEY Patented Sept. 30, 1947

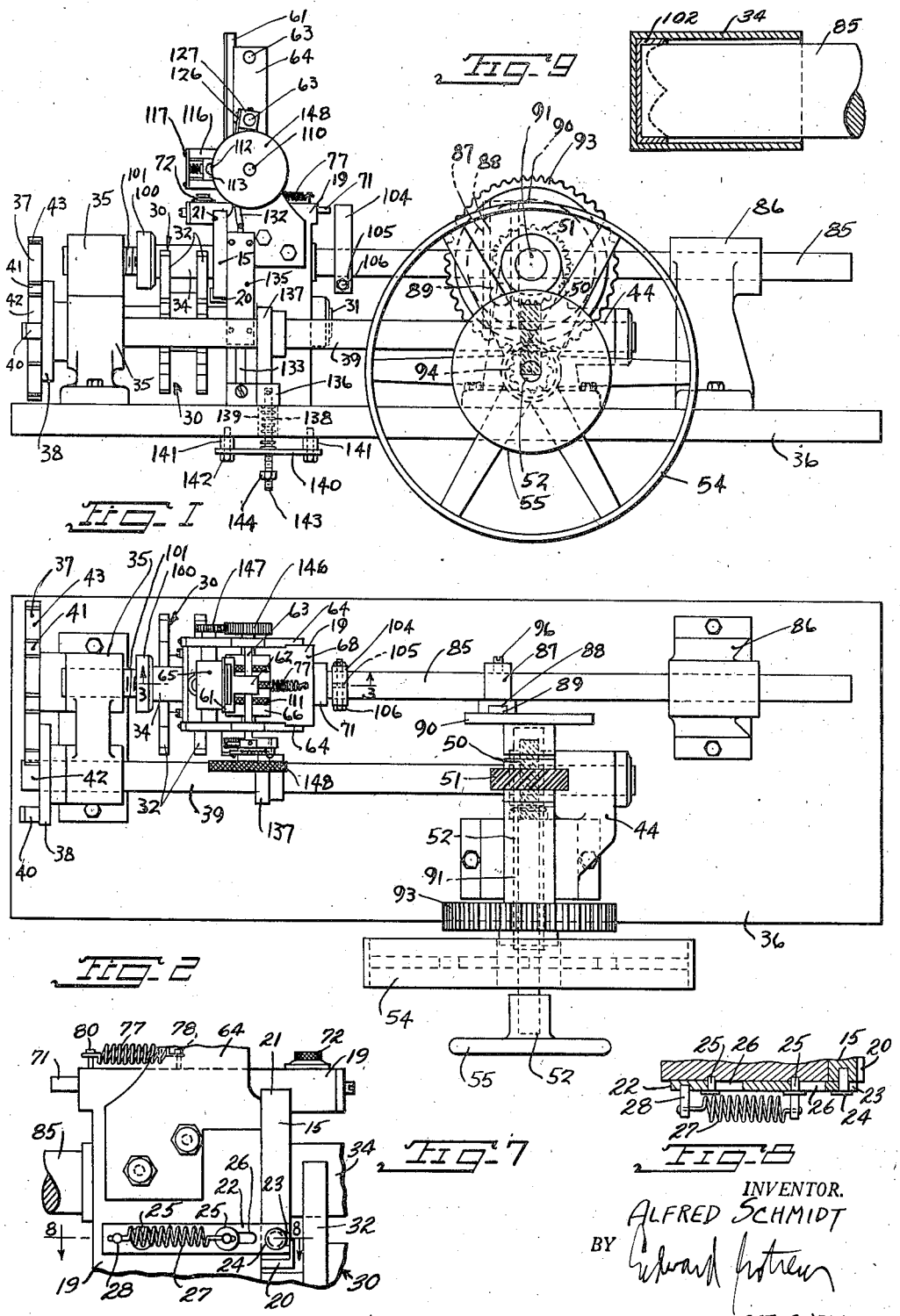

2,428,098

UNITED STATES PATENT OFFICE 2,428,098

BOTTOM WASHER MACHINE FOR BATTERY CANS

Alfred Schmidt, Weehawken, N. J.

Application January 11, 1945, Serial No. 572,411

19 Claims. (Cl. 93—36.01)

This invention relates to new and useful improvements in a bottom washer machine for battery cans.

The dominating feature of the new machine resides in the fact that it automatically stamps, or cuts, washers from a roll of washer material and automatically engages these washers into the bottoms of battery cans. In the particular design of the machine disclosed, the cut washers are square, and the four corners are turned up when the washers are pushed into the battery cans. By turning up the four corners of each washer, it has a tendency to locate the bobbin, or dolly of the battery cell in the center of the can. However, it must be clear that many shapes and designs of washers may be automatically cut, and engaged in place in the battery cans with the new bottom washer machine. The new machine improves the present practice of punching washers from washer material with the usual punch press, and thereafter placing the washers into the bottoms of the cans.

The invention also proposes the construction of a bottom washer machine for battery cans which embodies numerous desirable features. For example, it is proposed to provide the machine with a bottom washer receiving die. Battery can feeding means is arranged to feed the battery cans to a position in back of the die, and then past the die. There is means for guiding a strip of washer material towards said die. A cutter is provided for cutting a bottom washer from said strip of washer material for entering the die. This cutter may be a stamping proposition, such as a usual die and plunger, or it may comprise a simple cutting operation, such as with knife blades.

The cut washers are guided to enter the die. It is proposed to provide a plunger in front of the die for forcing a washer into the back of a can in back of said die.

The invention contemplates that said plunger be synchronized with the can feeding means so that the plunger will insert a washer into each can, as the cans are moved past said die.

It is proposed to provide means for operating the cutter which cuts the washers from the washer material strip, so as to keep the die supplied with washers. The strip of washer material is associated with feeding means for keeping the cutter supplied.

The new invention proposes to provide a stop for engaging against the back of the can which is positioned to the back of the die so as to hold the can while the plunger moves rearwards for forcing a cut washer into the bottom of the can. It is proposed to make this stop adjustable so that strips of washer material of different thickness are useable in this machine.

The invention proposes to removably mount said bottom washer receiving die so that it may be easily removed and replaced when it is required to make a die change.

It is proposed to provide an adjustment for the means which feeds the strip of washer material, so that it is possible to select a suitable size for the washers that are being cut off from the strip.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a bottom washer machine for battery cans, constructed in accordance with this invention.

Fig. 2 is a plan view of Fig. 1.

Fig. 3 is a fragmentary enlarged vertical sectional view taken on the line 3—3 of Fig. 2.

Fig. 4 is a transverse sectional view taken on the line 4—4 of Fig. 3.

Fig. 5 is a fragmentary longitudinal vertical sectional view taken on the line 5—5 of Fig. 4.

Fig. 6 is a fragmentary enlarged vertical sectional view taken on the line 6—6 of Fig. 4.

Fig. 7 is a fragmentary rear elevational view of a portion of the machine, this view being taken looking in the direction of the line 7—7 of Fig. 4.

Fig. 8 is a fragmentary horizontal sectional view taken on the line 8—8 of Fig. 7.

Fig. 9 is a fragmentary longitudinal sectional view through one of the battery cans, and illustrating the plunger of the machine within the can as it appears when forcing a washer into the bottom of the can.

Fig. 10 is an end elevational view of the battery can shown in Fig. 9 with the plunger removed and looking into the open end of the can.

Fig. 11 is a perspective view of one of the washers, with a schematic showing of the line of bending of the washer when it is forced into the battery can.

The bottom washer machine for battery cans, in accordance with this invention, includes a bottom washer receiving die 15. This die is in the form of a metal plate. It has an opening 16 extended downward from the top edge, through which a cut washer may fall so as to assume a position in front of a circular opening 17 formed in the die. This circular opening 17 has its front edges 18 rounded so as to facilitate bending of the edge portions of the washer, as will be herein after more fully described. The die 15 is removably mounted on a body 19 of the machine. It is slidably supported on a track 20 mounted upon the back face of the body 19. The top edge portion of the die 15 engages a groove 21 formed in the top portion of the body 19.

The die 15 is removably held on the body 19 by a latch. This latch includes a bolt 22 slidably mounted on the body 19 and having a forked end 23 engageable behind a headed stud 24 mounted on one edge of the die 15. The bolt 22 is slidably supported by several studs 25 mounted on the body 19 and engaging through slots 26 formed in said bolt 22. A spring 27 is mounted between one of the studs 25 and a pin 28 mounted on the bolt 22. The spring 27 urges the bolt 22 into its locking position. The pin 28 may be gripped and moved so as to move the bolt 22 to an open position free from the headed stud 24. Then the die 15 is free to be removed. It may be gripped and slide out from its position.

Battery cans feeding means is arranged to feed battery cans to a position in back of the die 15 and then past the die. This means includes a battery can holding wheel 30 mounted on a shaft 31. The wheel 30 has a pair of spaced flanges 32 which are formed with notches 33 to receive and hold battery cans, as for example, the battery can 34 illustrated in position in several views of the drawings.

One end of the shaft 31 is supported by the body 19. The other end of this shaft is supported by a standard 35. The body 19, and standard 35 are mounted upon a base plate 36 of the machine. A Geneva drive notched wheel 37 is mounted upon the shaft 31, and is engaged by a drive pinion 38 mounted on a shaft 39 rotatively supported at one end on said standard 35. The Geneva drive is of standard construction. It has the usual pin 40 for engaging the peripheral slots 41 formed in the Geneva drive wheel 37.

The Geneva drive pinion 38 is also formed with the usual holding projection 42 which engages cutouts 43 on said wheel 37 and located between said slots 41. The other end of the shaft 39 is rotatively supported in a standard 44 also mounted on the base 36.

The shaft 39 is provided with a spiral gear 50 meshing with a spiral gear 51 mounted on a shaft 91 rotatively supported on the standard 44. A stud shaft 52 is mounted on said standard 44. The shaft 52 is provided with a drive pulley 54. It is also provided with a small wheel 55 by which said shaft 52 may be manually turned, whenever this is desired. It should be recognized that when the pulley 54 is driven rotations will be transmitted by said shaft 52 to a pinion 94 mounted on the shaft 52 and meshing with a gear 93 which is mounted on said shaft 91. Rotations of the shaft 91 will be transmitted by spiral gears 50 and 51 to the shaft 39, the Geneva drive and then to the can holding wheel 30. It is proposed to supply the wheel 30 with cans in the usual way, by a supply chute, not shown on the drawing. It is proposed that the cans with the washers, to be conveyed away from the machine by a discharge chute, not shown on the drawings, such chutes being generally known in the art. It is pointed out that said wheel 30 will move in steps. It will position the battery can 34 directly behind the die 15, for a short period of time, and then will move this can away, and will position on a new can behind the die 15. In this way the operation continues.

The bottom washer receiving die 15 is associated with means for guiding a strip of washer material 60 towards the die. This strip of washer material 60 may be from a large roll of washer material, or from any other supply source. The strip of washer material 60 is guided through a flat tubular member 61 which is provided with a pair of lugs 62 by which it is mounted on rods 63. These rods 63 are stationarily mounted across brackets 64 which are mounted upon the sides of said body 19. The strip of washer material 60 after leaving the flat tubular member 61 passes between a pair of rollers 65 and 66. These rollers act to guide said strip of washer material. They also act as feeding rollers, as hereinafter more fully explained. The strip of washer material 60 continues downwards entering a slot 67 formed in a top portion 68 of said body 19. The slot 67 is aligned with the opening 16. For this reason washers cut from the strip 60, may enter the die 15 and assume a position across the front opening 17.

The cutter for cutting a washer from the strip of washer material 60 is located immediately above the die 15. This cutter may be of any design and construction. It may act in the manner of a punch, for not only cutting washers from the strip of washer material, but it may cut washers of any selected design or shape. In the particular form of the cutter, illustrated upon the drawings, it comprises a stationary knife 70 and a moveable knife 71. The stationary knife 70 is mounted in an opening in the top portion 68. It is held in position by a screw 72 which passes downwardly through a slot 73 formed in the moveable knife blade 71.

The stationary blade 70 has a beveled cutting edge 74. The moveable blade 71 has a complementary beveled cutting edge 75. The moveable blade 71 has an opening 76 through which the washer strip 60 may pass, to enter the die 15. A spring 77 urges the moveable blade 71 into a retracted position. The spring 77 is connected with a stud 78 mounted on the moveable blade 71 and passing through an opening 79 formed in the top portion 68. The spring 77 is also connected with a stationary stud 80 mounted on the top portion 68. The spring 77 acts to draw the moveable blade 71 frontwards, that is, away from the die 15. After the cutter, cuts off a washer from the washer strip 60, the washer is free to fall into the opening 16 of the die 15, and this opening therefore, acts as means for guiding the washer to enter the die 15 correctly.

A plunger 85 has one of its ends slidably engaging through the body 19 for forcing a washer from the die 15 into the can 34 which is to the back of the die 15. The plunger 85 has its other end slidably supported in a standard 86 which is also mounted on the base 36 of the machine. Said plunger 85 is associated with means by which it may be reciprocated for synchronization with the battery can feeding means so that the plunger may force a washer into a can, each time that a can is moved back of the die. This means for reciprocating the plunger 85, includes a bracket 87 mounted upon the plunger 85 and provided with a vertical slot 88. A pin 89 which is mounted on a disc 90 engages the vertical slot 88. The pin 89 is eccentrically arranged on said disc 90. The disc 90 is supported on the shaft 91, which is rotatively mounted through said standard 44. The shaft 91 is provided with said gear 93 which meshes with said pinion 94 on the shaft 52. Consequently rotations from the pulley 54 will be transmitted by the shaft 52, pinion 94, gear 93, to the shaft 91. This will rotate the disc 90, and the eccentrically mounted pin 89 will reciprocate the plunger 85.

A set screw 96 connects the bracket 87 with the plunger 85 which permits a longitudinal adjustment of the plunger 85 to a satisfactory position. A back stop 100 is adjustably mounted on the standard 35 and is positioned to the back of the can 34 which is behind the opening 17 of the die 15. This back stop 100 is supported on a threaded shank 101 which is threadedly mounted on the standard 35. By the proper adjustment of the back stop 100, and the plunger 85, and the bracket 87 it is possible to so arrange the parts that when the plunger 85 is in its extreme rear position, it will be completely within the battery can 34 as illustrated in Fig. 9. At this moment the battery can 34 is forced tightly against the back stop 100 and a bottom washer 102, see Fig. 9, will be properly positioned within the battery can. The parts may be adjusted to compensate for different thicknesses of the material from which the washers are made.

Since the plunger 85 is reciprocated indirectly from the drive pulley 54, and since the Geneva drive is driven indirectly by the same drive pulley 54, it will be readily recognized that it is merely a matter of design to properly synchronize the operation of the plunger 85 with the means for feeding the battery cans to the position in back of the die 15 and then past the die.

The cutter blade 71 is automatically operated for cutting washers for the die 15, to keep the die supplied with washers. For this purpose a finger 104 is mounted upon the plunger 85. This finger 104 has a slotted bottom end 105 through which a clamp bolt 106 passes, by which the bracket 104 may be clamped onto the plunger 85, in proper position, so that when the plunger 85 is near its extreme rear position, the position in which it is completely in the can, as illustrated in Fig. 9, the bracket 104 will strike the projecting end of the blade 71, moving the blade rearwards so that the cutting edges 74 and 75 cooperate to cut off the washer from the washer strip 60. However, it should be clear that the washer strip 60 must be properly fed downwards, so that there is a suitable length of washer material beneath the cutting blades 70 and 71 so that the proper size of washer is cut off. The cut off washer will first rest upon the top of the plunger 85. When the plunger 85 reaches a position near its complete forward position, the position in which it is toward the right, then the washer 102 which was just cut off from the washer material 60, will fall down and assume a position directly behind the opening 17 in the die 15. The next time the plunger 85 moves rearwards it will force this washer 102 into the can 34.

The means for the properly feeding the washer strip 60 to keep the cutter properly supplied, includes the said rollers 65 and 66. The roller 66 is rotatively mounted between the brackets 64. More specifically, it is mounted upon a shaft 110 which is rotatively supported by the brackets 64. The roller 66 has several knurled circumferential areas 111 for assisting in gripping the washer strip 60. The roller 65 is mounted upon a shaft 112 which is rotatively supported in blocks 113. These blocks 113 are slidably mounted upon tracks 114 formed upon the top and bottom faces of openings 115 formed in lugs 116 projecting from the brackets 64. Strips 117 close the ends of the grooves 115. Small expansion springs 118 act between the strips 117 and the blocks 13 for indirectly resiliently urging the roller 65 towards the roller 66. Small set screws 120, see Fig. 6, are adjustably mounted in the bases of the grooves 115 and limit the action of the springs 118 so that the roller 65 will not contact, and in time damage, the knurling 111 of the roller 66. However, the roller 65 is urged sufficiently close to the roller 66 so that the strip of washer material 60 is gripped and held.

The shaft 110 projects from one of the brackets 64. This projecting end is provided with a ratchet wheel 125. A leaf spring 126 which is mounted on a block 127 which in turn is mounted on one of the rods 63, engages the ratchet wheel 125 to prevent back turning of the shaft 110. A lever 128 is loosely mounted on the shaft 110. This lever 128 carries a pawl 129 which is urged against the ratchet wheel 125 by a spring 130. The spring 130 acts between the pawl 129 and a pin 131 mounted on the lever 128 to urge the pawl 129 against the ratchet wheel 125.

One end of the lever 128 is pivotally connected with a link 132 which in turn is pivotally connected with a bar 133 which is slidably mounted in a groove 134 formed in the body 19. A plate 135 engages over the groove 134 for holding the bar 133 from coming out of the groove. The bottom end of the bar 133 is provided a finger 136 which is engaged by a cam 137 mounted on the shaft 39. The finger 136 is urged upwards against the cam 137 by an expansion spring 138 which is mounted through an opening 139 formed in the base plate 36. This spring 138 acts between the bottom of the finger 136 and a bar 140 which is mounted by several washers 141 and screws 142 on the bottom of the base 36. A stud 143 is connected with the finger 136 and is provided with a nut 144 which may be fixed in adjusted positions. This nut 144 will strike said bar 140 when the finger 136 moves upwards. For this reason the finger 136 cannot follow the cam 137 completely upwards, but will be stopped some distance from the top position of the cam.

The adjustment nut 144 will control the length of the washer strip 60 which is fed downwards. When the cam 137 moves the finger 136 downwards, the motion will be transmitted by the bar 133, the link 132, the lever 128 and the pawl 129 to the ratchet wheel 125 for turning the ratchet wheel 125 a preselected distance and indirectly turning the drive roller 66 which feeds the washer strip 60 downwards. The length of feeding of the washer strip 60 will be controlled by the distance that the cam 137 moves the finger 136 downwards. The shafts 110 and 112 are connected with each other by gears 146 and 147 mounted on these shafts, and meshing with each other. With this arrangement rotations from the roller 66 will be transmitted indirectly to turn the roller 65 and assist in the feeding of the washer strip 60. A knurled hand wheel 148 is mounted on the shaft 110 by which the rollers 65 and 66 may be manually turned when it is desired to unthread the washer strip 60. To do this it is necessary to flex the spring 126 to disengage it from the ratchet wheel 125, and also it is necessary to lift up the pawl 129.

The operation of the device is as follows:

Let us start considering the operation of the machine at the point where the plunger 85 starts moving towards the die 15. It strikes the washer 102 in front of it and forces the washer through the die opening 17 which bends the edge portions about the dot and dash line circle 150, as schematically illustrated in Fig. 11. In this bent condition of the washer, it is forced into the can 34 until it reaches the bottom of the can 34, as illustrated in Fig. 9. Figs. 1 to 5 illustrate the machine in a position a short time before the plunger 85 reaches its position fully in the can 34. In the illustrated position the cam 137 is at its bottommost position in which the finger 136 was pressed downwards to its full extent, and indirectly through the bar 133, the link 132, the lever 128 and pawl 129, caused the washer strip 60 to be fed downwards, a washer length. Next the bracket 104 on the moving plunger 85 will strike the knife 71 moving it so that the cutting edges 75 and 74 cooperate to cut off a washer from the washer strip 60. The cut off washer will fall down slightly and then will rest on the plunger 85. By this time, the plunger 85 has completely placed a washer 102 into the can 34.

The plunger 85 now moves outwards, and when its end passes the slot 16 of the die 15, the newly cut washer will fall down and assume a position back of said plunger 85. As soon as the plunger 85 is moved completely out of the can 34, the mechanism which moves the cans 34 will operate. The Geneva drive functions to indirectly turn the wheel 30 an amount which will cause the can 34 with its washer to be moved away from the back of the die 15, and will cause a new can to be moved into the position now occupied by said can 34. The operation is now ready to be repeated.

The timing of the machine may be understood by noting that the plunger 85 will reciprocate once for each time that the disc 90 makes one revolution, caused by the eccentric pin 89 which engages the slot 88 of bracket 87. Furthermore, shafts 39 and 91 are rotating at the same speed. The Geneva advances one notch for each reciprocation of the plunger 85. The washer material 60 advances one washer length for each rotation of shaft 39.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, and means for feeding said strip of washer material to keep said cutter supplied.

2. A bottom washer machine for battery cans, comprising a bottom washer receiving die, a support for said receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, means for feeding said strip of washer material to keep said cutter supplied, and means for releasably holding said receiving die on said support.

3. A bottom washer machine for battery cans, comprising a bottom washer receiving die, a support for said receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, means for feeding said strip of washer material to keep said cutter supplied, and means for releasably holding said receiving die on said support including a latch for holding said die in position.

4. A bottom washer machine for battery cans, comprising a bottom washer receiving die, a support for said receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for receiprocating said plunger synchronized with said can feeding means for inserting a washer into each can as the cans are removed past said die, means for operating said cutter for cutting washers for the die to keep the die supplied with washers, means for feeding said strip of washer material to keep said cutter supplied, and means for releasably holding said receiving die on said support including a latch for holding said die in position, said latch comprising a bolt slidably mounted and having a forked end, and a headed stud on one side of said bottom washer receiving die engageable on said forked end for holding the die in position.

5. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, and means for feeding said strip of washer material to keep said cutter supplied, said means for guiding said strip of washer material includes a flat tubular member stationarily mounted and through which said strip of washer material passes.

6. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, and means for feeding said strip of washer material to keep said cutter supplied, said means for guiding said strip of washer material includes a flat tubular member stationarily mounted and through which said strip of washer material passes, and said means for feeding said strip of washer material including a pair of rollers beneath said flat tubular member and between which said strip of washer material passes.

7. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, and means for feeding said strip of washer material to keep said cutter supplied, said means for guiding said strip of washer material includes a flat tubular member stationarily mounted and through which said strip of washer material passes, and said means for feeding said strip of washer material including a pair of rollers beneath said flat tubular member and between which said strip of washer material passes, one of said rollers being resiliently mounted and urged towards the other roller for more securely holding said washer material.

8. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washer for the die to keep the die supplied with washers, and means for feeding said strip of washer material to keep said cutter supplied, said means for guiding said strip of washer material includes a flat tubular member stationarily mounted and through which said strip of washer material passes, and said means for feeding said strip of washer material including a pair of rollers beneath said flat tubular member and between which said strip of washer material passes, one of said rollers being resiliently mounted and urged towards the other roller for more securely holding said washer material, and said means for feeding said strip of washer material including a ratchet wheel connected with one of said rollers, a lever pivotally mounted adjacent said ratchet wheel, a pawl mounted on said lever and resiliently urged against said ratchet wheel, and means synchronized with the operation of said plunger for moving said lever to feed said washer material.

9. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washer for the die to keep the die supplied with washers, and means for feeding said strip of washer material to keep said cutter supplied, said means for guiding said strip of washer material includes a flat tubular member stationarily mounted and through which said strip of washer material passes, and said means for feeding said strip of washer material including a pair of rollers beneath said flat tubular member and between which said strip of washer material passes, one of said rollers being resiliently mounted and urged towards the other roller for more securely holding said washer material, and said means for feeding said strip of washer material including a ratchet wheel connected with one of said rollers, a lever pivotally mounted adjacent said ratchet wheel, a pawl mounted on said lever and resiliently urged against said ratchet wheel, and means synchronized with the operation of said plunger for moving said lever to feed said washer material, and including a link pivotally connected with said lever, a bar slidably mounted and connected with said link, a finger mounted on said bar, and a cam for depressing said finger.

10. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washer for the die to keep the die supplied with washers, and means for feeding said strip of washer material to keep said cutter supplied, said means for guiding said strip of washer material includes a flat tubular member stationarily mounted and through which said strip of washer material passes, and said means for feeding said strip of washer material including a pair of rollers beneath said flat tubular member and between which said strip of washer material passes, one of said rollers being resiliently mounted and urged towards the other roller for more securely holding said washer material, and said means for feeding said strip of washer material including a ratchet wheel connected with one of said rollers, a lever pivotally mounted adjacent said ratchet wheel, a pawl mounted on said lever and resiliently urged against said ratchet wheel, and means synchronized with the operation of said plunger for moving said lever to feed said washer material, and including a link pivotally connected with said lever, a bar slidably mounted and connected with said link, a finger mounted on said bar, and a cam for depressing said finger, resilient means urging said finger upwards, and stop means for limiting the amount said finger may move upwards and follow said cam.

11. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, and means for feeding said strip of washer material to keep said cutter supplied, said cutter comprising two sections one of which is stationary and the other of which moves towards the stationary section for cutting the washer.

12. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, and means for feeding said strip of washer material to keep said cutter supplied, said means for reciprocating said plunger includes a continuously rotating disc provided with an eccentric pin, and a bracket mounted on said plunger and having a slot engaged by said eccentric pin by which said plunger is reciprocated.

13. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, and means for feeding said strip of washer material to keep said cutter supplied, said means for reciprocating said plunger includes a continuously rotating disc provided with an eccentric pin, and a bracket mounted on said plunger and having a slot engaged by said eccentric pin, by which said plunger is reciprocated, said means for feeding battery cans includes a Geneva drive for feeding said battery cans in place.

14. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, and means for feeding said strip of washer material to keep said cutter supplied, said cutter includes a moveable section which is moved for the cutting operation, and a bracket mounted on said plunger and engageable with said moveable section for operating said cutter.

15. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, and means for feeding said strip of washer material to keep said cutter supplied, and including an adjustment for controlling the amount by which said strip of washer material is fed forwards for each washer cut from said strip of material.

16. A bottom washer machine for battery cans, comprising a driven shaft provided with a disc having an eccentric pin, a bottom washer receiving die, means for feeding battery cans to a position in back of said die and then past said die and including a rotative wheel having flanges with opening for receiving the battery cans, and a transmission from said driven shaft including a Geneva drive for periodically turning said wheel, means for guiding a strip of washer material towards said die, a cutter for cutting a bottom washer for said strip for entering said die, means for guiding said washer to enter said die, a plunger in front of said die for forcing a washer from said die and into the can in back of said die, means for reciprocating said plunger synchronized with said can feeding means for inserting a washer into each can as the cans are moved past said die and including a bracket mounted on said plunger and having a slot engaged by said eccentric pin by which said plunger is reciprocated, means for operating said cutter for cutting washers from said strip of washer material to keep said die supplied with washers, and means for feeding said strips of washer material to keep said cutter supplied.

17. A bottom washer machine for battery cans, comprising a driven shaft provided with a disc having an eccentric pin, a bottom washer receiving die, means for feeding battery cans to a position in back of said die and then past said die and including a rotative wheel having flanges with openings for receiving the battery cans, and a transmission from said driven shaft including a Geneva drive for periodically turning said wheel, means for guiding a strip of washer material towards said die, a cutter for cutting a bottom washer for said strip for entering said die, means for guiding said washer to enter said die, a punger in front of said die for forcing a washer from said die and into the can in back of said die, means for reciprocating said plunger synchronized with said can feeding means for inserting a washer into each can as the cans are moved past said die, and including a bracket engaged by said eccentric pin by which said plunger is reciprocated, means for operating said cutter for cutting washers from said strip of washer material to keep said die supplied with washers, and means for feeding said strips of washer material to keep said cutter supplied, said means for operating said cutter including a bracket mounted on said plunger and engageable with said cutter for operating the cutter.

18. A bottom washer machine for battery cans, comprising a driven shaft provided with a disc having an eccentric pin, a bottom washer receiving die, means for feeding battery cans to a position in back of said die and then past said die and including a rotative wheel having flanges with openings for receiving the battery cans, and a transmission from said driven shaft including a Geneva drive for periodically turning said wheel, means for guiding a strip of washer material towards said die, a cutter for cutting a bottom washer for said strip for entering said die, means for guiding said washer to enter said die, a plunger in front of said die for forcing a washer from said die and into the can in back of said die, means for reciprocating said plunger synchronized with said can feeding means for inserting a washer into each can as the cans are moved past said die, and including a bracket engaged by said eccentric pin by which said plunger is reciprocated, means for operating said cutter for cutting washers from said strip of washer material to keep said die supplied with washers, and means for feeding said strips of washer material to keep said cutter supplied, including a cam operated by said transmission.

19. A bottom washer machine for battery cans, comprising a bottom washer receiving die, means for feeding battery cans to a position in back of said die and then past said die, means for guiding a strip of washer material towards said die, a cutter for cutting a bottom washer from said strip for entering said die, means for guiding said washer to enter said die, a plunger in front of said die for forcing a washer from said die and into the can in back of said die, means for reciprocating said plunger synchronized with said can feeding means for inserting a washer into each can as the cans are removed past said die, means for operating said cutter for cutting washers for the die to keep the die supplied with washers, means for feeding said strip of washer material to keep said cutter supplied, and a back stop for the can which is in a position in back of said die.

ALFRED SCHMIDT.

REFERENCES CITED

The following references are of record in the file of this patent:

UNITED STATES PATENTS

| Number | Name | Date |
|---|---|---|
| 1,037,005 | Hiller et al. | Aug. 27, 1912 |
| 1,047,530 | Jenkins | Dec. 17, 1912 |
| 2,061,576 | Huyett | Nov. 24, 1936 |